United States Patent
Barenyi

[11] 3,825,297
[45] July 23, 1974

[54] ARRANGEMENT OF A ROOF IN A MOTOR VEHICLE

[75] Inventor: Bela Barenyi, Maichingen, Germany

[73] Assignee: Daimler-Benz Aktiengesellschaft, Stuttgart, Germany

[22] Filed: Sept. 13, 1972

[21] Appl. No.: 288,798

[52] U.S. Cl............................ 296/137 R, 296/28 R
[51] Int. Cl............................................. B62d 25/06
[58] Field of Search........ 296/137 R, 137 B, 137 C, 296/102, 28 R, 99

[56] References Cited
UNITED STATES PATENTS

| | | | |
|---|---|---|---|
| 2,947,567 | 8/1960 | Barenyi | 296/28 R |
| 2,991,120 | 7/1961 | Barenyi | 296/137 R |
| 3,169,793 | 2/1965 | Barenyi | 296/137 R |
| 3,319,996 | 5/1967 | Calthorpe | 296/137 R |

Primary Examiner—Philip Goodman
Assistant Examiner—Johm A. Carroll
Attorney, Agent, or Firm—Graig & Antonelli

[57] ABSTRACT

An arrangement of a roof of a motor vehicle, especially of a passenger motor vehicle, which includes two lateral roof girders extending approximately from a windshield pane to a rear window panel; the roof girders are disposed above the base surface of the roof constructed as lifting or pivoting roof, which is provided within the area of the roof girders with raised portions projecting upwardly above its base surface and whose edges serve as boundary for door apertures.

43 Claims, 6 Drawing Figures

PATENTED JUL 23 1974    3,825,297

ARRANGEMENT OF A ROOF IN A MOTOR VEHICLE

The present invention relates to the arrangement of a roof of a motor vehicle, especially of a passenger motor vehicle; which includes two lateral roof girders extending approximately from a windshield pane to a rear window pane.

In order to enlarge in motor vehicles the boarding height within the area of the doors, it would appear at first blush to be obvious to raise the entire vehicle and therewith to raise also the doors. It is also known in the prior art to utilize doors which include an upper edge angularly bent off into the roof plane. Even though it is possible with this type of prior art construction to improve the convenience during the boarding into the vehicle, without increasing the height of the vehicle itself, considerable sealing difficulties result therefrom within the area of the roof surface. Additionally, considerable sacrifices as regards roof rigidity have to be accepted with such prior art devices which is practically incompatible with the present-day safety requirements.

The present invention is concerned with the task to create an arrangement of a roof of the aforementioned type which enables a considerable increase of the boarding height with only a slight increase of the end face or area. The present invention essentially consists in that the roof girders are disposed above the base surface of the roof constructed as lifting or pivoting roof, which is provided with the area of the roof girder with raised portions in the form, for example, of embossments, pressed-out portions or the like projecting upwardly above its base surface and whose edges serve as boundary of door apertures. With this construction, which is completely unproblematical as regards the sealing, the advantage results that only the roof and the roof girders have to be changed, whereas all remaining vehicle parts which adjoin the same, especially the doors, can remain unchanged. A roof plate is thereby used, which itself does not have to fulfill any supporting function for the rigidity of the vehicle so that it becomes possible without difficulty to make the same of light metal or possibly of transparent synthetic plastic material or the like.

The roof surface may have any desired shape. In order to attain a sufficient enlargement of the boarding height, it is appropriate if the roof girders are arranged at least at the height of the apex line of the base surface in the vertical vehicle center plane.

The roof girders projecting above the base surface of the roof impart to the vehicle a high roll-over strength since, on the one hand, they absorb the obstacle earlier and, on the other, they permit a great freedom of the design and dimensioning of the cross section. This very great roll-over strength and rigidity can be increased according to a further feature of the present invention in that the roof girders are connected by a cross bearer preferably in the center and/or are supported by a center column.

In one structurally advantageous embodiment of the present invention, the roof girders are constructed as approximately U-shaped curved members whose legs delimit the lateral edges of the windshield pane and/or the rear window pane. It is advantageous for the rigidity of the roof if the roof girders are connected by way of cross bearers enclosing the upper edges of the windshield pane and the rear window pane.

In a further embodiment of the present invention, provision is made that the raised portions such as pressed-out portions or embossments of the roof surround the roof girders with a spacing. The roof girders can thereby be utilized as handles or the like.

The raised portions in the form of pressed-out portions, embossments or the like of the roof plate can be utilized for the mounting of further equipments. In one embodiment, provision is made that the raised portions are connected with transverse rods. These transverse rods can be utilized as luggage carrier or rack and especially as ski support or also as ventilating devices. In one further embodiment of the present invention, ventilating and air-conditioning devices and/or lights are inserted into the pressed-out, raised portions.

Accordingly, it is an object of the present invention to provide a roof for a motor vehicle which obviates the aforementioned shortcomings and drawbacks encountered in the prior art.

Another object of the present invention resides in a motor vehicle roof which enables an improved boarding height within the area of the doors to improve the boarding convenience.

A further object of the present invention resides in a motor vehicle roof which increases the boarding height without causing any sealing problems and/or sacrifices as regards roof rigidity.

Still another object of the present invention resides in a motor vehicle roof, especially in a passenger motor vehicle roof which is simple in construction, provides no problem as regards sealing of the doors, especially in case of frame-less door windows, and exhibits particularly high roll-over rigidity.

These and further objects, features and advantages of the present invention will become more apparent from the following description when taken in conjunction with the accompanying drawing which shows, for purposes of illustration only, one embodiment in accordance with the present invention, and wherein.

Figure 1:
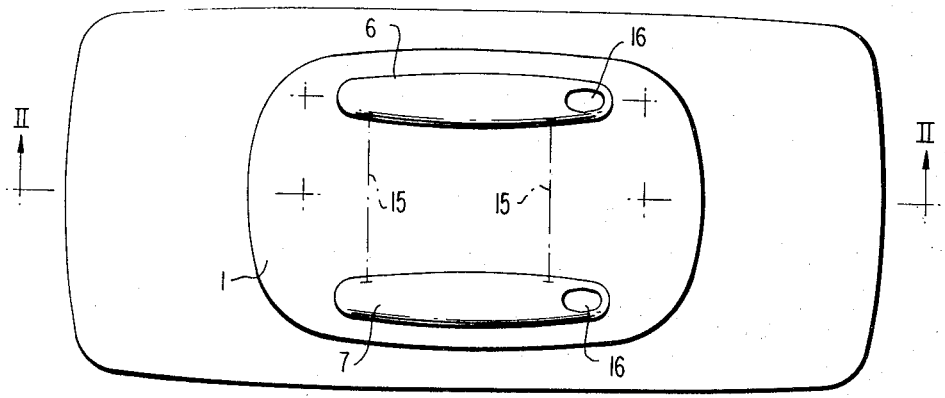
FIG. 1 is a schematic plan view of one arrangement according to the present invention of a roof of a motor vehicle.
Figure 2:
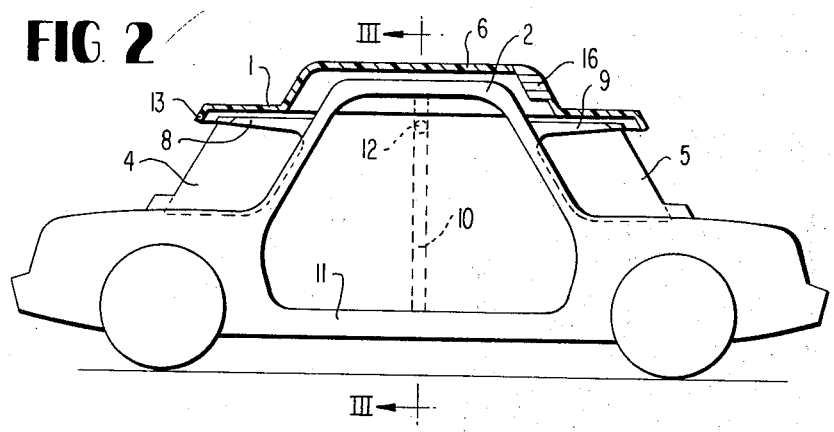
FIG. 2 is a schematic cross-sectional view, taken along line II-II of FIG. 1.
Figure 3:
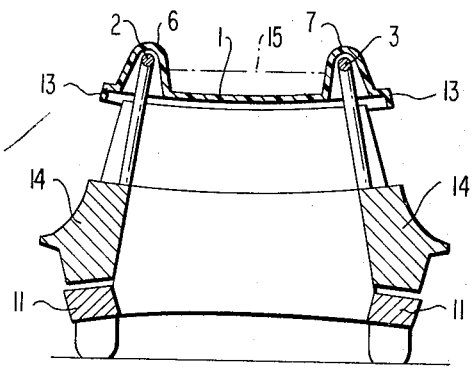
FIG. 3 is a schematic cross-sectional view, taken along line III-III of FIG. 2.

Referring now to the drawing wherein like reference numerals are used throughout the various views to designate like parts, the motor vehicle only schematically illustrated in FIGS. 1 to 3 includes within the area of the roof 1 two longitudinal girders 2 and 3 which extend from the windshield pane 4 to the rear window pane 5. The roof girders 2 and 3 are disposed above the base surface of the roof 1 concavely curved in cross section, which is provided within the area of the roof girders 2 and 3 with upwardly directed raised portions 6 and 7 in the form of pressed-out portions, embossments or the like extending in the vehicle longitudinal direction. The roof girders 2 and 3 are connected with each other by two cross bearers 8 and 9 which enclose the upper edges of the windshield pane 4 and of the rear window pane 5. In order to further increase the shape-rigidity of the roof, a center column 10 may be additionally provided on each side, as indicated in dash line in FIG. 2, which connect the longitudinal bearers 11 disposed approximately in the wheel track with the roof girders 2 and 3. This center column 10 or also the roof girders 2 and 3 may be additionally connected with cross bearers 12 also indicated in dash line in FIG. 2.

The roof 1 is constructed as a roof plate made of light metal or synthetic plastic material of any conventional type which assumes no function for the rigidity of the vehicle. This roof plate is provided with a peripheral downwardly bent-off edge 13 which surrounds the windshield pane 4, the rear window pane 5 and the lateral doors 14.

The doors 14 are so constructed that they are sealed off by means of the edge 13 of the roof plate and that they can be opened without lifting the roof plate. In this case, the distance between the longitudinal bearer 11 and the edge 13 of the roof plate is available as boarding height.

The roof 1 is constructed as lifting or pivoting roof of conventional construction and therefore not illustrated in detail herein. For that purpose, adjusting mechanisms (not shown) of conventional construction are provided by means of which the entire roof can be lifted or by means of which the roof can be pivoted about a pivot axis located within the area of the windshield pane or possibly the rear window pane. The lifting or pivoting takes place to such an extent that the edge 13 of the roof plate comes to lie approximately at the height of the roof girders 2 and 3. As a result thereof, the entire distance between the longitudinal bearers 11 and the roof girders 2 and 3 is made available as boarding height. Since these adjusting mechanisms are known as such in the art and form no part of the present invention and since they utilize commercially available mechanical, electrical, pneumatic or hydraulic devices, a detailed description thereof is dispensed with herein.

Even though the roof plate has no support function, there is no reason why it cannot be utilized as loading platform or the like. As indicated in dash and dot lines in FIGS. 1 and 3, cross rods 15 may be mounted between the stamped-out, raised portions 6 and 7 which are adapted to be snapped-in or are readily detachable and which are component parts of a luggage rack or serve as ski mounts, ventilating and/or air-conditioning means or the like. Additionally, ventilating and/or air-conditioning devices as well as other equipments may be accommodated within the pressed-out, raised portions 6 and 7. In FIGS. 1 and 2, one light 16 each is provided, for example, in the rearward, approximately vertically disposed area of the pressed-out, raised portions 6 and 7.

The roof girders 2 and 3 are constructed as approximately U-shaped curved members (as viewed in FIG. 2) which delimit the part of the door apertures beginning at the lower edge of the windshield pane 4 and of the rear window pane 5. Additionally, they enclose the lateral edges of the windshield pane 4 and of the rear window pane 5.

Figure 4:
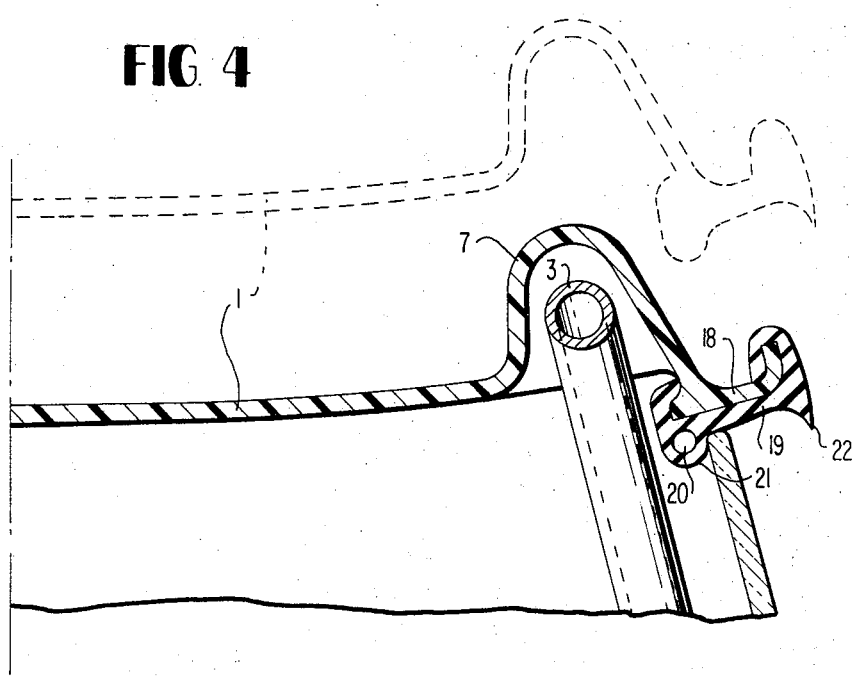
FIG. 4 is a partial cross-sectional view, similar to FIG. 2, on an enlarged scale.

FIG. 4 illustrates how the sealing of the upper edge of a frameless side window 17 or of the window of a door 14 can be realized in accordance with the present invention. For that purpose, a sealing profile 19 is mounted on the edge 18 of the roof which is angularly bent outwardly and again upwardly; the sealing profile 19 includes a bead 21 provided with a hollow space 20, against which abuts the side window 17. On the outside, the sealing profile 19 is provided with a downwardly projecting, lip-shaped extension 22 which serves as wiper for the side window 17. An approximately U-shaped bent circular pipe is provided in this embodiment as roof girder 3 and also for girder 2 (not shown). The roof plate of FIG. 4 made of synthetic plastic material includes pressed-out, raised portion 7 which surrounds the roof girder 3 with a spacing so that the sealing profile 19 rests with certainty on the side window 17. Additionally, the lifted position of the roof 1 is illustrated in FIG. 4 in dash lines.

Figures 5, 6:
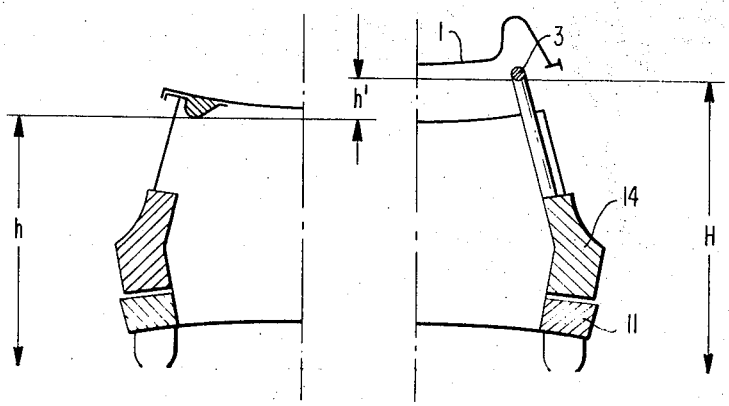
FIGS. 5 and 6 are schematic partial cross-sectional views illustrating a comparison between an arrangement in accordance with the present invention and the prior art.

In FIGS. 5 and 6, a roof arrangement according to the present invention is illustrated in comparison with a prior art roof arrangement. It can be readily recognized from these two views that with the same height of the doors 14 and with a lifted roof 1, the boarding height H in the arrangement according to the present invention (FIG. 4) is higher by the amount $h'$ than the boarding height $h$ in the prior art construction (FIG. 6).

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A vehicle roof arrangement comprising:
   a roof structure including a base surface, at least one raised portion projecting upwardly above the base surface, and an edge portion at the periphery of the roof structure being at the same level as said base surface, said edge portion defining an upper limit of a door aperture on the vehicle, and
   at least one roof girder means extending approximately longitudinally from a front portion of a vehicle towards a rear portion of the vehicle, said at least one roof girder means being arranged at a height above said base surface,
   said roof structure being a lifting roof adapted to be lifted in the vertical direction such that a boarding height of the vehicle is increased to the height of said at least one roof girder means.

2. An arrangement according to claim 1, wherein two roof girder means are provided at lateral portions of the vehicle, and said roof structure includes two raised portions corresponding to respective ones of said two roof girder means.

3. An arrangement according to claim 2, wherein said front portion of said vehicle is at a windshield pane and said rear portion of said vehicle is at a rear window pane.

4. An arrangement according to claim 1, wherein said edged portion includes a sealing means at a portion facing said door aperture for sealing a window of a door in said door aperture.

5. An arrangement according to claim 1, wherein said roof structure is a pivoting roof, said pivoting roof being pivoted about a transverse axis.

6. An arrangement according to claim 5, wherein said transverse axis is disposed at said front portion of the vehicle.

7. An arrangement according to claim 1, characterized in that the roof girder means are arranged at least at the height of the apex line of the base surface of the roof structure in the vertical vehicle longitudinal center plane.

8. An arrangement according to claim 2, characterized in that the two roof girder means are connected with each other.

9. An arrangement according to claim 8, characterized in that the roof girder means are connected with each other substantially in the center by a cross bearer.

10. An arrangement according to claim 9, characterized in that the roof girder means are supported by a center column means.

11. An arrangement according to claim 10, characterized in that the roof girder means are constructed as approximately U-shaped curved members whose leg portions delimit the lateral edges of at least one of the windshield pane and of the rear window pane.

12. An arrangement according to claim 10, characterized in that the roof girder means are constructed as approximately U-shaped curved members whose leg portions delimit the lateral edges of the windshield pane and of the rear window pane.

13. An arrangement according to claim 12, characterized in that the roof girder means are connected by way of cross bearer means enclosing the upper edge of the windshield pane and of the rear window pane.

14. An arrangement according to claim 13, characterized in that the raised portions of the roof surround the roof girder means with a spacing.

15. An arrangement according to claim 14, characterized in that the raised portions are connected by means of cross rods.

16. An arrangement according to claim 15, characterized in that ventilating and air-conditioning means are installed in the raised portions.

17. An arrangement according to claim 16, characterized in that light means are installed in the raised portions.

18. An arrangement according to claim 17, characterized in that the raised portions are constituted by embossments in the roof plates.

19. An arrangement according to claim 17, characterized in that the raised portions are constituted by pressed-out portions.

20. An arrangement according to claim 17, characterized in that the roof is constructed as lifting roof adapted to be lifted in the vertical direction.

21. An arrangement according to claim 17, characterized in that the roof is constructed as pivoting roof pivotal about a transverse axis.

22. A vehicle roof arrangement comprising:
at least one roof girder means extending approximately longitudinally across a front portion of a vehicle toward a rear portion of a vehicle, and
a roof structure including a base surface and at least one raised portion projecting upwardly above the base surface,
said at least one roof girder means being arranged above said base surface within said at least one raised portion.

23. An arrangement according to claim 22, wherein two roof girder means are provided at lateral portions of the vehicle, and said roof structure includes two raised portions corresponding to respective ones of said two roof girder means.

24. An arrangement according to claim 22, wherein said front portion of said vehicle is at a windshield pane and said rear portion of said vehicle is at a rear window pane.

25. An arrangement according to claim 22, wherein said roof girder means serves as a boundary for at least a portion of a door aperture of said vehicle.

26. An arrangement according to claim 23, wherein said front portion of said vehicle is at a windshield pane and said rear portion of said vehicle is at a rear window pane.

27. An arrangement according to claim 26, wherein said roof girder means serves as a boundary for at least a portion of a door aperture of said vehicle.

28. An arrangement according to claim 23, wherein said roof girder means serves as a boundary for at least a portion of a door aperture of said vehicle.

29. An arrangement according to claim 23, characterized in that the raised portions are connected by means of cross rods.

30. An arrangement according to claim 22, characterized in that ventilating and air-conditioning means are installed in the raised portions.

31. An arrangement according to claim 22, characterized in that light means are installed in the raised portions.

32. An arrangement according to claim 23, characterized in that the raised portions are constituted by embossments in the roof plates.

33. An arrangement according to claim 23, characterized in that the raised portions are constituted by pressed-out portions.

34. An arrangement according to claim 22, characterized in that the roof structure is constructed as lifting roof adapted to be lifted in the vertical direction.

35. An arrangement according to claim 24, characterized in that the roof structure is constructed as pivoting roof pivotal about a transverse axis.

36. An arrangement according to claim 35, characterized in that the axis is disposed within the area of the windshield.

37. An arrangement according to claim 23, characterized in that the roof girder means are connected with each other.

38. An arrangement according to claim 37, characterized in that the roof girder means are connected with each other substantially in the center by a cross bearer.

39. An arrangement according to claim 22, characterized in that the roof girder means are supported by a center column means.

40. An arrangement according to claim 26, characterized in that the roof girder means are constructed as approximately U-shaped curved members whose leg portions delimit the lateral edges of at least one of the windshield pane and of the rear window pane.

41. An arrangement according to claim 26, characterized in that the roof girder means are constructed as approximately U-shaped curved members whose leg portions delimit the lateral edges of the windshield pane and of the rear window pane.

42. An arrangement according to claim 26, characterized in that the roof girder means are connected by way of cross bearer means enclosing the upper edge of the windshield pane and of the rear window pane.

43. An arrangement of a roof of a motor vehicle which includes two lateral roof girder means extending approximately from a windshield pane to a rear window pane, characterized in that the roof girder means are located above the base surface of the roof, the roof being provided within the area of the roof girder means with raised portions projecting upwardly above its base surface, and the edges of said raised portions serving as boundary for at least portions of door apertures, and characterized in that the raised portions of the roof surround the roof girder means with a spacing.

* * * * *

UNITED STATES PATENT OFFICE
CERTIFICATE OF CORRECTION

Patent No. 3,825,297          Dated     July 23, 1974

Inventor(s)     Bela Barenyi

It is certified that error appears in the above-identified patent and that said Letters Patent are hereby corrected as shown below:

Title page, insert the following:

[30] Foreign Application Priority Data

September 13, 1971     Germany...... P 21 45 636.0

Signed and sealed this 3rd day of December 1974.

(SEAL)
Attest:

McCOY M. GIBSON JR.
Attesting Officer

C. MARSHALL DANN
Commissioner of Patents